United States Patent
Pohlkamp

(10) Patent No.: US 9,784,235 B2
(45) Date of Patent: Oct. 10, 2017

(54) PILOT FUEL INJECTION ADAPTATION

(71) Applicant: Ford Global Technologies, LLC, Dearborn, MI (US)

(72) Inventor: Kyle Pohlkamp, Brighton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 112 days.

(21) Appl. No.: 14/740,552

(22) Filed: Jun. 16, 2015

(65) Prior Publication Data
US 2016/0369765 A1  Dec. 22, 2016

(51) Int. Cl.
*F02P 19/00* (2006.01)
*F02P 19/02* (2006.01)
*F02D 41/40* (2006.01)

(52) U.S. Cl.
CPC .......... *F02P 19/026* (2013.01); *F02D 41/403* (2013.01); *F02P 19/021* (2013.01)

(58) Field of Classification Search
CPC .... F02P 19/026; F02D 41/3005; F02D 41/26; F02D 41/403
See application file for complete search history.

(56) References Cited

U.S. PATENT DOCUMENTS

| | | | | |
|---|---|---|---|---|
| 3,809,029 A | * | 5/1974 | Wakamatsu | .......... F02D 41/365 123/406.61 |
| 4,217,863 A | * | 8/1980 | Ezoe | ....................... F02D 41/12 123/494 |
| 4,722,310 A | * | 2/1988 | Igashira | ................ F02D 35/022 123/300 |
| 5,241,929 A | | 9/1993 | Grassi et al. | |
| 7,167,790 B2 | | 1/2007 | Kikutani | |
| 7,373,918 B2 | * | 5/2008 | Uchiyama | ........... F02D 41/1498 123/299 |
| 7,383,116 B2 | | 6/2008 | Damitz et al. | |
| 7,658,174 B2 | * | 2/2010 | Stoller | ................... F02P 19/022 123/145 A |
| 7,895,990 B2 | * | 3/2011 | Ishizuka | ............. F02D 41/2438 123/478 |
| 7,931,012 B2 | * | 4/2011 | Schumacher | ......... F02D 35/026 123/145 A |
| 8,676,476 B2 | * | 3/2014 | Malikopoulos | ..... F02D 41/1406 701/102 |
| 9,388,787 B2 | * | 7/2016 | Neely | .................... F02P 19/021 |
| 2013/0041571 A1 | * | 2/2013 | Nogi | ..................... F02D 41/025 701/103 |
| 2013/0152894 A1 | | 6/2013 | To et al. | |

OTHER PUBLICATIONS

Van Nieuwdstadt, M. et al., "Method of Pilot Injection Control," U.S. Appl. No. 14/444,766, filed Jul. 28, 2014, 47 pages.

* cited by examiner

*Primary Examiner* — Hieu T Vo
*Assistant Examiner* — Sherman Manley
(74) *Attorney, Agent, or Firm* — Julia Voutyras; McCoy Russell LLP

(57) ABSTRACT

Methods and systems for adapting pilot fuel injection pulse widths are disclosed. In one example, pilot fuel injection values are varied to determine adjustments to a fuel injector transfer function and a glow plug is activated in response to a request to adapt the fuel injector transfer function so that adaptation may be improved.

18 Claims, 4 Drawing Sheets

PILOT FUEL INJECTION ADAPTATION

BACKGROUND/SUMMARY

Fuel may be supplied to a cylinder of diesel engine during an engine cycle via one or more fuel injection pulses. A first group of fuel injections provided to an engine cylinder during a cycle of the cylinder may be referred to as pilot fuel injections. The pilot fuel injections may be followed by a main injection. The main injection may be followed during the same cylinder cycle via post injections. The pilot fuel injections may be useful to reduce engine noise while the main fuel injection has a purpose of generating engine torque. Post fuel injections may be provided to the engine to deliver thermal energy to emission control devices in the engine's exhaust system or to provide reductants to the emission control devices. Variation in fuel flow for different fuel injectors of the same type may be pronounced at smaller fuel pulse widths where fuel injectors provide pilot fuel injections. Therefore, it may be desirable to periodically update fuel injector transfer functions in a fuel pulse width region or range where the pilot fuel injections are provided. However, it may be difficult to determine fuel injector transfer function errors when an engine is operated with short duration pilot fuel injections. Consequently, it may be difficult to accurately update the fuel injector transfer function when the engine is operated with short duration pilot fuel injections.

The inventors herein have recognized the above-mentioned disadvantages and have developed an engine operating method, comprising: receiving sensor data to a controller; judging if conditions are present for adjusting a fuel injector transfer function via the controller based on the sensor data; and activating a glow plug via the controller in response to the conditions being present.

By selectively operating glow plugs in response to a request to adapt a fuel injector transfer function, it may be possible to provide the technical result of improving fuel injector transfer function adaptation. For example, one or more engine glow plugs may be activated so as to provide more stable and repeatable combustion in engine cylinders during adapting of fuel injector transfer functions. The activated glow plugs may heat engine cylinders to improve combustion stability, thereby providing more uniform engine torque production and engine air-fuel ratio.

The present description may provide several advantages. Specifically, the approach may improve adaptation of fuel injector transfer functions. In addition, the approach may improve engine emissions and combustion stability via providing fuel to the engine more accurately. Further, the approach may reduce engine emissions and noise.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
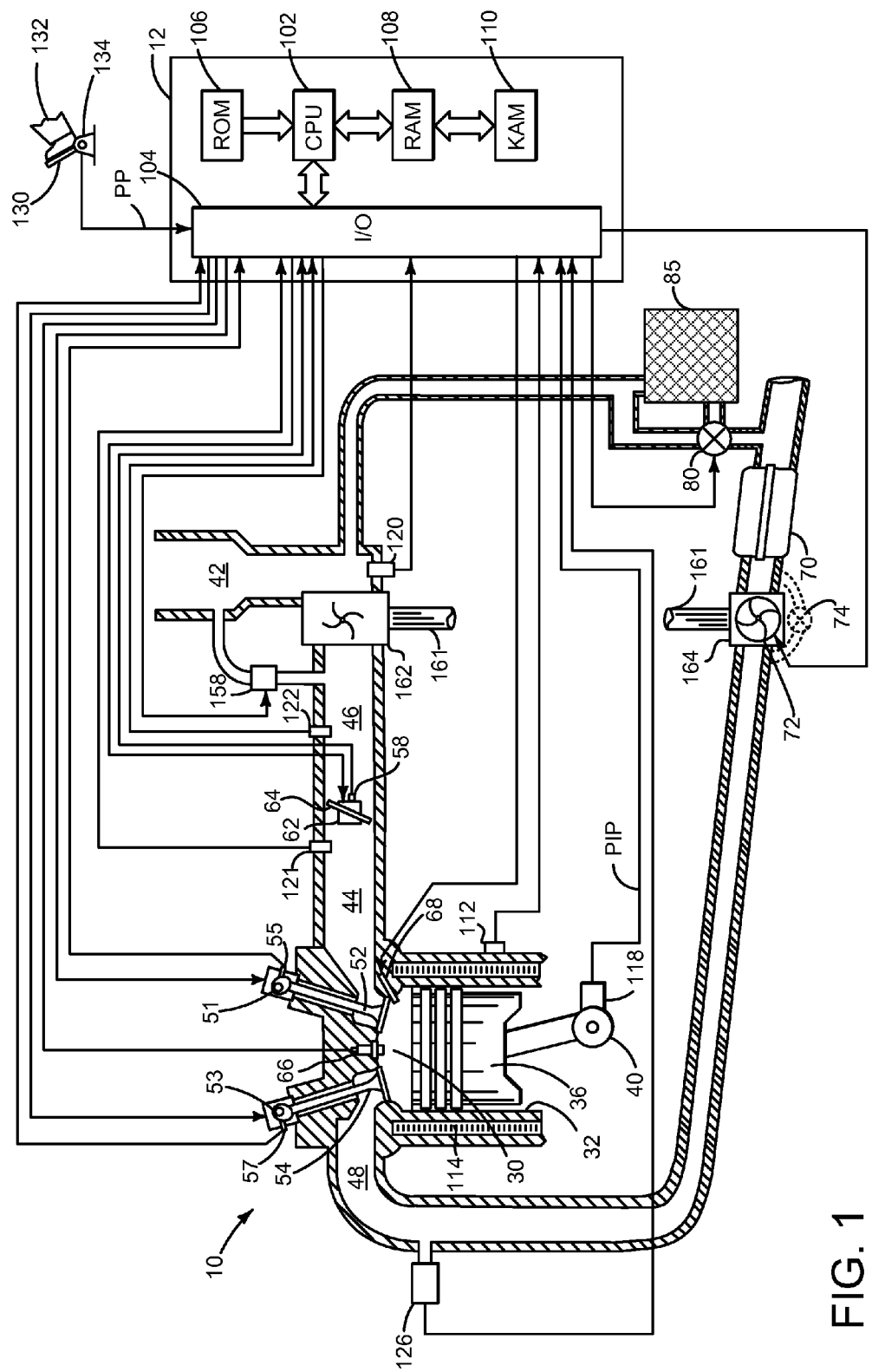
FIG. 1 shows a schematic depiction of an engine.
Figure 2:
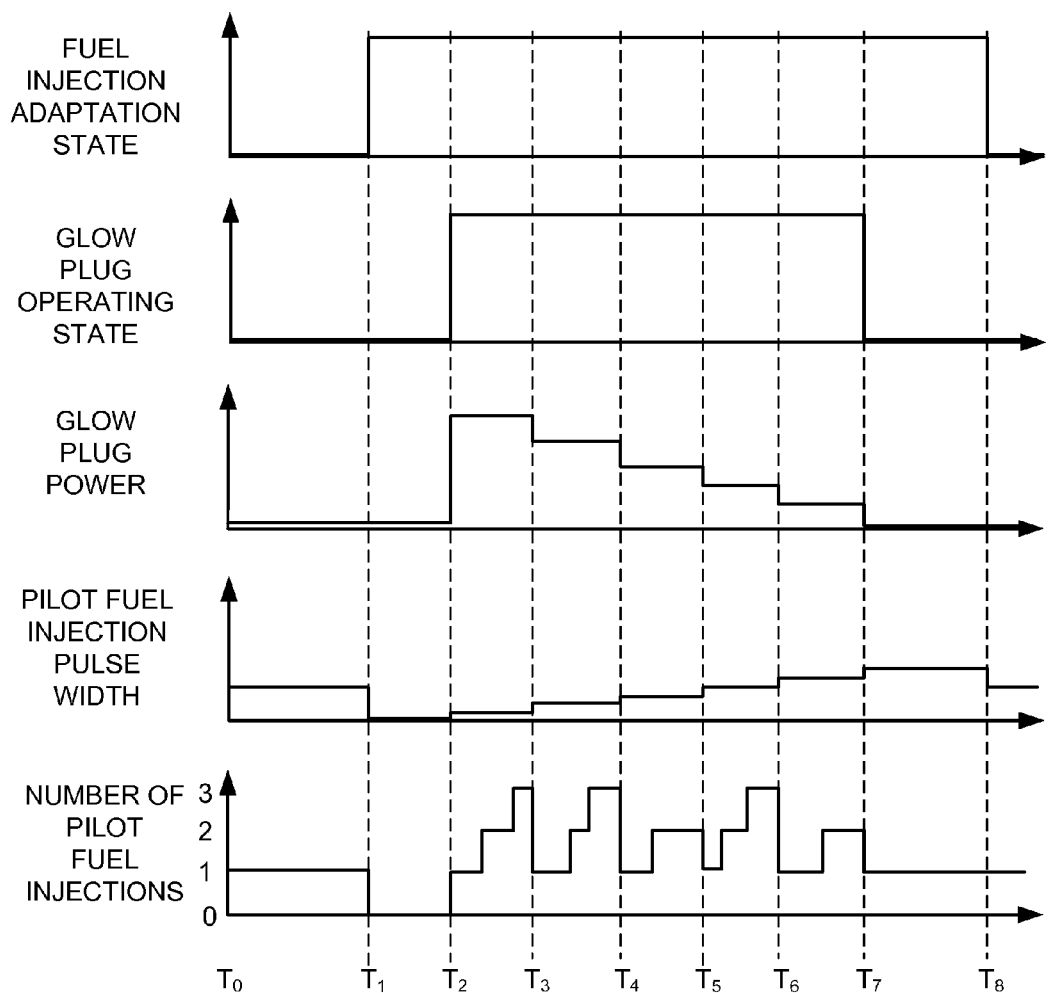
FIG. 2 shows an example engine operating sequence according to the method of FIGS. 3 and 4.
Figure 3:
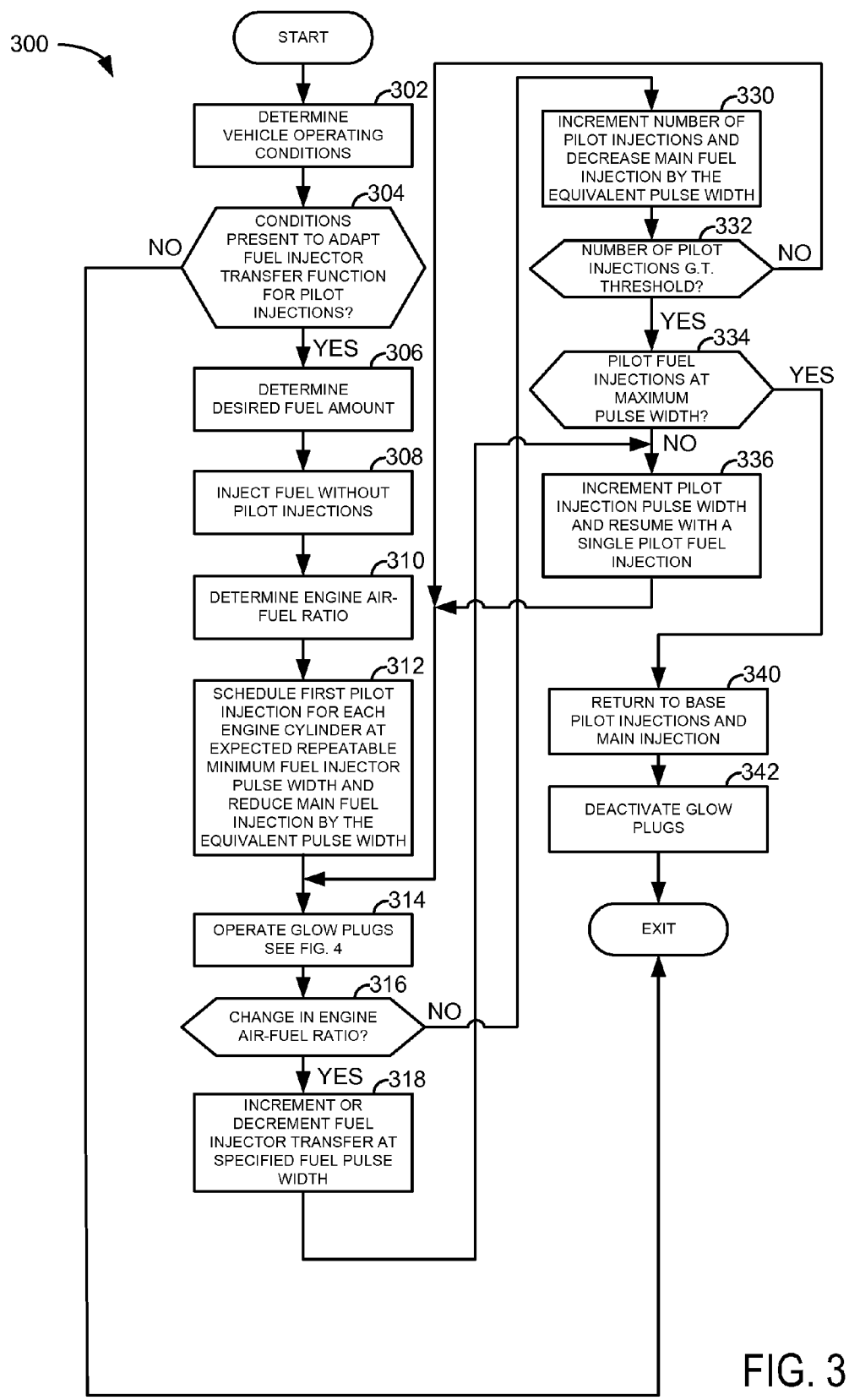
FIGS. 3-4 show an example method for adapting a fuel injector transfer function.
Figure 4:
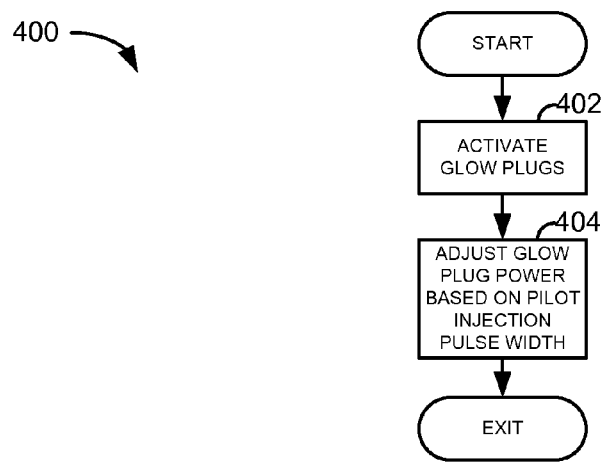

The present description is related to adapting a fuel injector transfer function so as to reduce engine noise and improve combustion within engine cylinders. FIG. 1 shows one example of a boosted diesel engine where the method of FIGS. 3 and 4 may adjust glow plug operation and combustion phasing to improve engine torque production, combustion stability, and reduce engine combustion noise. An engine operating sequence is shown in FIG. 2 where a fuel injector transfer function is adjusted. FIGS. 3 and 4 show an example method for adjusting a transfer function that describes fuel injector operation.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Fuel injector 66 delivers fuel in proportion to a pulse width from controller 12. Fuel is delivered to fuel injector 66 by a fuel system (not shown) including a fuel tank, fuel pump, fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. In some examples, a charge air cooler may be provided. Compressor speed may be adjusted via adjusting a position of variable vane control 72 or compressor bypass valve 158. In alternative examples, a waste gate 74 may replace or be used in addition to variable vane control 72. Variable vane control 72 adjusts a position of variable geometry turbine vanes. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, waste gate 74 allows exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce intake manifold pressure.

Combustion is initiated in combustion chamber 30 when fuel ignites via compression ignition as piston 36 approaches top-dead-center compression stroke. In some examples, a universal Exhaust Gas Oxygen (UEGO) sensor 126 may be coupled to exhaust manifold 48 upstream of emissions device 70. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures glow plug 68 may convert electrical energy into thermal energy so as to raise a temperature in combustion chamber 30. By raising temperature of combustion chamber 30, it may be easier to ignite a cylinder air-fuel mixture via compression. Controller 12 adjusts current flow and voltage supplied to glow plug 68. In this way, controller 12 may adjust an amount of electrical power supplied to glow plug 68.

Emissions device 70 can include a particulate filter and catalyst bricks, in one example. In another example, multiple emission control devices, each with multiple bricks, can be used. Emissions device 70 can include an oxidation catalyst in one example. In other examples, the emissions device may include a lean NOx trap or a selective catalyst reduction (SCR), and/or a diesel particulate filter (DPF).

Exhaust gas recirculation (EGR) may be provided to the engine via EGR valve 80. EGR valve 80 is a three-way valve that closes or allows exhaust gas to flow from downstream of emissions device 70 to a location in the engine air intake system upstream of compressor 162. In alternative examples, EGR may flow from upstream of turbine 164 to intake manifold 44. EGR may bypass EGR cooler 85, or alternatively, EGR may be cooled via passing through EGR cooler 85. In other, examples high pressure and low pressure EGR system may be provided.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by driver 132; a measurement of engine manifold pressure (MAP) from pressure sensor 121 coupled to intake manifold 44; boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Thus, the system of FIG. 1 provides for an engine system, comprising: an engine having a combustion chamber; a fuel injector and a glow plug protruding into the combustion chamber; and a controller including instructions to activate the glow plug in response to a request to adjust a fuel injector transfer function in a pulse width region where pilot fuel injections are provided. The engine system further comprises operating the fuel injector in the pulse width region where pilot fuel injects are provided in response to the request to adjust the fuel injector transfer function. The engine system further comprises additional controller instructions for adjusting the fuel injector transfer function in response to an engine air-fuel ratio. The engine system further comprises additional controller instructions for adjusting the fuel injector transfer function in response to engine torque. The engine system further comprises additional controller instructions to decrease power supplied to the glow plug in response to increasing a pilot fuel injection pulse width. The engine system includes where the fuel injector transfer function describes fuel injector flow.

Referring now to FIG. 2, an example engine operating sequence is shown. The operating sequence may be provided by the method of FIGS. 3 and 4 operating in conjunction with the system of FIG. 1. Vertical lines at times T1-T8 represent times of interest during the engine operating sequence.

The first plot from the top of FIG. 2 is a plot of the fuel injection adaptation state versus time. The vertical axis represents fuel injection adaption state. The fuel injector transfer function is being adapted or adjusted when the trace is at a higher level near the vertical axis arrow. The horizontal axis represents time and time increases from the left side of the plot to the right side of the plot.

The second plot from the top of FIG. 2 is a plot of the glow plug operating state versus time. The vertical axis represents glow plug operating state. The glow plug is activated when the trace is at a higher level near the vertical axis arrow. The glow plug is deactivated when the trace is at a lower level near the vertical axis arrow. The horizontal axis represents time and time increases from the left side of the plot to the right side of the plot.

The third plot from the top of FIG. 2 is a plot of electrical power supplied to the glow plug versus time. The vertical axis represents power supplied to the glow plug power and power supplied to the glow plug increases in the direction of the vertical axis arrow. The horizontal axis represents time and time increases from the left side of the plot to the right side of the plot.

The fourth plot from the top of FIG. 2 is a plot of the fuel injector pulse width versus time. The vertical axis represents fuel injector pulse width and fuel injector pulse width increases in the direction of the vertical axis arrow. The greater the fuel injector pulse width, the greater the amount of fuel injected to a cylinder. The horizontal axis represents time and time increases from the left side of the plot to the right side of the plot.

The fifth plot from the top of FIG. 2 is a plot of a number of pilot fuel injections delivered to a cylinder during a single cycle of the cylinder versus time. The vertical axis represents the number of pilot fuel injections delivered to a cylinder during a single cylinder cycle for a particular cylinder and the number of pilot fuel injections increases in the direction of the vertical axis arrow. The number of pilot fuel injections is shown along the vertical axis. The horizontal axis represents time and time increases from the left side of the plot to the right side of the plot.

At time T0, adaptation of the fuel injector transfer function is not activated as indicated by the fuel injection adaptation state trace being at a lower level near the horizontal axis. The glow plugs are not activated and glow plug power is zero. The pilot fuel injection pulse with is at a lower middle level and the number of pilot fuel injections is one.

At time T1, fuel injector transfer function adaptation is activated as indicated by the fuel injection adaptation state transitioning to a higher level. The main fuel injection pulse width (not shown) is adjusted to a valve based on engine speed and driver demand torque (not shown). All fuel injected to a cylinder during the cylinder's cycle is injected during the main injection. The engine air-fuel ratio and torque are monitored during the fuel injector transfer function adaptation.

At time T2, the pilot injection to the engine via the fuel injector is started so that the fuel injector transfer function may be adjusted for a small fuel amount being injected during via pilot injection. The pilot injection fuel amount is increased to a first amount. The glow plugs are activated as indicated by the glow plug operating state transitioning to a higher state in response to activating pilot injection during fuel injector transfer function adaptation. The amount of electrical energy supplied to the glow plug is at a higher level in response to the small amount of pilot fuel injected so that the pilot injected fuel may ignite and combust more reliably. The amount of fuel injected in the pilot fuel injection during a cylinder cycle is an amount of fuel removed from the main fuel injection during the cylinder cycle. Thus, if the pilot fuel injection delivers the desired amount of fuel, the total amount of fuel injected to the cylinder during a cylinder cycle is equivalent to the amount of fuel delivered to the cylinder via the single main fuel pulse width at time T1.

Between time T2 and time T3, fuel injector adaptation state remains high and the glow plug continues to operate at a higher power level. The pilot fuel injection pulse width remains constant, but the number of pilot injections is increased from one to two and then to three. Each time the number of pilot injections is increased, an amount of fuel added to the pilot fuel injections is removed from the main fuel injection pulse width so that an amount of fuel delivered to the cylinder is the same as the number of pilot fuel injections increases. By increasing the number of pilot fuel injections and requesting a same amount of fuel in each pilot injection, it may be possible to increase a signal to noise ratio of the amount of fuel injected in the pilot injections. For example, if a single pilot injection during a cylinder cycle is delivered to a cylinder and the main fuel injection in the cylinder cycle is reduced by an amount of fuel expected to be in the pilot fuel injection, a change in engine air-fuel ratio or torque may not be noticeable. However, if the number of pilot fuel injections is increased and a same amount of fuel requested injected in each pilot injection, an error in delivered fuel amount in the pilot fuel injections may be more noticeable due to the increased number of pilot fuel injections. In this example, a change in engine air-fuel ratio and torque is not noticeable so the number of pilot injections is incremented until a value of three pilot fuel injections is reached.

At time T3, the number of pilot fuel injections is adjusted from three to one and the pilot fuel injection fuel amount is increased. By increasing the pilot fuel injection fuel amount, different portions of the fuel injector transfer functions may be adapted. The pilot fuel injection amount is increased in response to the number of pilot fuel injections reaching three without a noticeable engine air-fuel ratio or torque change. The fuel injection adaptation state remains asserted at a higher level and the glow plugs remain activated. The amount of electrical power supplied to the glow plug is reduced in response to the amount of fuel injected in each pilot injection increasing.

Between time T3 and time T4, fuel injector adaptation state remains high and the glow plug continues to operate at a higher power level. The pilot fuel injection pulse width remains constant, but the number of pilot injections is increased from one to two and then to three. Each time the number of pilot injections is increased, an amount of fuel added to the pilot fuel injections is removed from the main fuel injection pulse width so that an amount of fuel delivered to the cylinder is the same as the number of pilot fuel injections increases.

At time T4, the number of pilot fuel injections is adjusted from three to one and the pilot fuel injection fuel amount is increased again. The pilot fuel injection amount is increased in response to the number of pilot fuel injections reaching three without a noticeable engine air-fuel ratio or torque change. The fuel injection adaptation state remains asserted at a higher level and the glow plugs remain activated. The amount of electrical power supplied to the glow plug is reduced in response to the amount of fuel injected in each pilot injection increasing.

Between time T4 and time T5, fuel injector adaptation state remains high and the glow plug continues to operate at a higher power level. The pilot fuel injection pulse width remains constant, but the number of pilot injections is increased from one to two. A change in engine air-fuel ratio is detected (not shown) so the fuel injector transfer function is adjusted and then the pilot fuel injection pulse width is increased.

At time T5, the number of pilot fuel injections is adjusted from two to one and the pilot fuel injection fuel amount is increased again. The pilot fuel injection amount is increased in response to adjusting the fuel injector pulse width in response to an observed engine air-fuel ratio change or an engine torque change. The fuel injection adaptation state remains asserted at a higher level and the glow plugs remain activated. The amount of electrical power supplied to the glow plug is reduced again in response to the amount of fuel injected in each pilot injection increasing.

Between time T5 and time T6, fuel injector adaptation state remains high and the glow plug continues to operate at a higher power level. The pilot fuel injection pulse width remains constant, but the number of pilot injections is increased from one to two and then to three. Each time the number of pilot injections is increased, an amount of fuel added to the pilot fuel injections is removed from the main fuel injection pulse width so that an amount of fuel delivered to the cylinder is the same as the number of pilot fuel injections increases.

At time T6, the number of pilot fuel injections is adjusted from three to one and the pilot fuel injection fuel amount is increased again. The pilot fuel injection amount is increased in response to the number of pilot fuel injections reaching three without a noticeable engine air-fuel ratio or torque change. The fuel injection adaptation state remains asserted at a higher level and the glow plugs remain activated. The amount of electrical power supplied to the glow plug is reduced in response to the amount of fuel injected in each pilot injection increasing.

Between time T6 and time T7, fuel injector adaptation state remains high and the glow plug continues to operate at a higher power level. The pilot fuel injection pulse width remains constant, but the number of pilot injections is increased from one to two. A change in engine air-fuel ratio is detected (not shown) so the fuel injector transfer function is adjusted again and then the pilot fuel injection pulse width is increased.

At time T7, the number of pilot fuel injections is adjusted from two to one and the pilot fuel injection fuel amount is increased again. The pilot fuel injection amount is increased in response to adjusting the fuel injector pulse width in response to an observed engine air-fuel ratio change or an engine torque change. The fuel injection adaptation state remains asserted at a higher level; however the glow plug is deactivated in response to the pilot fuel injection being greater than a threshold amount. The amount of electrical power supplied to the glow plug is reduced to zero in response to the amount of fuel injected in each pilot injection increasing.

Between time T7 and time T8, only one pilot fuel injection is provided since the amount of fuel in the pilot fuel injection is greater than a threshold. In this example, no change in engine air-fuel ratio or engine torque is noticed. Therefore, the fuel injection transfer function is not adjusted.

At time T8, the sequence ends with the fuel injection adaptation state transitioning to a lower level. The glow plug remains deactivated and a single pilot fuel injection is provided to the engine cylinder.

In this way, the fuel injector transfer function may be adjusted to improve accuracy of an amount of fuel injected. Because small amounts of fuel are injected during pilot fuel injection, a small error in the fuel injector transfer function may result in a large percentage increase or decrease in fuel injected. Thus, it may be desirable to adapt a fuel injection transfer function for small fuel injection amounts. Further, by increasing a number of pilot fuel injections, it may be possible to improve air-fuel error detection.

Referring now to FIGS. 3 and 4, a method for adapting a fuel injector transfer function is shown. The method of FIGS. 3 and 4 may be at least partially incorporated into the system of FIG. 1 as executable instructions stored in non-transitory memory. Further, the method of FIGS. 3 and 4 includes actions performed in the physical world. The method of FIGS. 3 and 4 may provide the operating sequence shown in FIG. 3.

At 302, method 300 determines vehicle operating conditions. Vehicle operating conditions may be determined via receiving output of sensors and actuators in the vehicle system. In one example, vehicle operating conditions include but are not limited to engine temperature, driver demand torque, engine speed, vehicle speed, engine air-fuel ratio, and distance traveled by the vehicle. Method 300 proceeds to 304 after determining vehicle operating conditions.

At 304, method 300 judges if conditions are present for adapting a fuel injector transfer function. The fuel injector transfer function describes fuel flow through a fuel injector versus fuel injector pulse width or time activated. In one example, conditions include the engine operating within a prescribed engine speed and load range. Further, it may be desirable for the engine temperature to be within a desired temperature range. Further still, it may be desirable for the vehicle in which the engine operates to have traveled a predetermined distance. If method 300 judges that conditions are present for adapting a fuel injector transfer function, the answer is yes and method 300 proceeds to 306 based on a request to adapt the fuel injector transfer function. Otherwise, the answer is no and method 300 proceeds to exit. Additionally, method 300 may exit if operating conditions change after the request to adapt the fuel injector transfer function. For example, method 300 may exit if a driver depresses an accelerator pedal to increase a driver demand.

At 306, method 300 determines a desired amount of fuel to inject to one or more engine cylinders. In one example, the desired fuel amount may be based on accelerator pedal position and vehicle speed and/or engine speed. In particular, the desired fuel amount to inject to an engine cylinder is empirically determined and stored in a table or function. The table or function is indexed via a desired engine torque as determined from accelerator pedal position and vehicle speed and/or engine speed. Method 300 proceeds to 308 after the desired amount of fuel to inject to engine cylinders is determined.

At 308, method 300 injects the desired amount of fuel into one or more engine cylinders. For example, the desired amount of fuel may be injected into each engine cylinder. The desired fuel amount is injected in one main fuel injection without pilot fuel injections. By injecting the desired amount of fuel in one main fuel injection, the fuel injection pulse width may be much greater than a pilot fuel injection pulse width so that baseline engine air-fuel ratio and baseline engine torque may be established in response to the fuel amount provided in the one main fuel injection. The start of fuel injection for a cylinder receiving the one main fuel injection during a cycle of the cylinder may also be adjusted to provide peak cylinder pressure for the cylinder at a predetermined crankshaft angle. Method 300 proceeds to 310 after the desired amount of fuel is injected to one or more engine cylinders.

At 310, method 300 determines engine air-fuel ratio. The engine air-fuel ratio may be determined in an exhaust manifold runner that directs exhaust from a sole cylinder to a confluence area where exhaust from more than one engine cylinder is directed. Alternatively, engine air-fuel ratio may be determined at the confluence area. Further, in some examples, engine torque may be determined. In one example, torque from a cylinder may be estimated based on engine acceleration (e.g., $T=j\dot{\omega}$, where T is torque, j is observed inertia at the engine crankshaft, and ω is angular acceleration) during a power stroke of the cylinder receiving the fuel. The engine air-fuel ratio without pilot injections provides a baseline air-fuel ratio for determining whether or not a desired fuel amount is provided during subsequent engine cycles when pilot fuel injection is enabled. Method 300 proceeds to 312 after engine and/or cylinder air-fuel ratio is determined.

At 312, method 300 schedules and activates pilot injection for each engine cylinder. Method 300 begins with providing a single pilot fuel injection during each cylinder cycle of the cylinder receiving the pilot fuel injection. The first pilot fuel injection pulse width duration is a smallest pulse width that is expected to provide a consistent or repeatable fuel injection amount. The main fuel injection provided during the cylinder cycle the pilot fuel injection is provided is reduced by a pulse width duration that corresponds to an amount of fuel commanded to be injected during the pilot fuel injection during the same cylinder cycle. For example, if the pilot fuel injection during a cylinder cycle is expected to inject X grams of fuel, the main fuel injection during the cylinder cycle is reduced by X grams of fuel so that the engine air-fuel and torque are expected to be constant. Method 300 proceeds to 314 after pilot fuel injection is enabled and pilot injection begins.

At 314, method 300 activates glow plugs in cylinders receiving the pilot fuel injection amount as described in FIG. 4. The glow plugs are activated to improve combustion by providing a heat source that may improve ignition. Further, activating the glow plugs may provide smoother and more consistent engine torque. Method 300 proceeds to 316 after glow plugs are activated.

At 316, method 300 judges if there is a change in engine air-fuel ratio. In some examples, method 300 may determine a change in engine air-fuel ratio is present if the engine or individual cylinder air-fuel ratio changes by greater than a predetermined amount. Alternatively, method 300 may judge if a change in engine torque production is present. In some examples, method 300 may determine a change in engine torque production is present if the engine or individual cylinder torque production is changed by greater than a predetermined amount. If method 300 judges a change in engine air-fuel ratio is present or if a change in engine torque production is present, the answer is yes and method 300 proceeds to 318. Otherwise, the answer is no and method 300 proceeds to 330.

At 318, method 300 increments or decrements the value in the fuel injector transfer function that corresponds to the pulse width provided to produce the present pilot fuel injection. For example, if the air-fuel ratio is leaner than expected, the value in the fuel injector transfer function that corresponds to the pilot fuel injection pulse width is increased to richen the engine and/or cylinder air-fuel ratio. If the air-fuel ratio is richer than expected, the value in the fuel injector transfer function that corresponds to the pilot fuel injection pulse width is decreased to lean the engine and/or cylinder air-fuel ratio. The change in engine air-fuel ratio or engine torque may be indicative of an undesirable value stored in the fuel injector transfer function. Similarly, if the engine torque is less than expected, the value in the fuel injector transfer function that corresponds to the pilot fuel injection pulse width is increased to increase engine torque. If the engine torque is greater than expected, the value in the fuel injector transfer function that corresponds to the pilot fuel injection pulse width is decreased to reduce engine torque. Method 300 proceeds to 336 after the fuel injector transfer function is adjusted.

At 336, method 300 increments the pilot fuel injection pulse width and resumes injecting fuel to engine cylinders with a single pilot fuel injection and a main fuel injection pulse width. The pilot fuel injection amount injected during a cylinder cycle increases as is shown in FIG. 2 by increasing an opening time of the fuel injector. The pilot fuel injection amount injected during a cylinder cycle may be increased by a predetermined amount. The total amount of fuel injected to the engine during an engine cycle (e.g., two engine revolutions) is the same as determined at 306. Thus, the pilot fuel injection amount plus the main fuel injection amount during a cylinder cycle is equal to the amount of fuel injected to the engine in the main fuel injection pulse width at 308. Method 300 returns to 314 after the pilot fuel injection fuel amount is increased.

At 330, method 300 increments the number of pilot fuel injections provided to one or more engine cylinders. For example, if presently only one pilot fuel injection is provided to a cylinder by a fuel injector, two pilot fuel injections are to be provided to the cylinder via the fuel injector. Likewise, pilot fuel injections for other engine cylinders are also incremented. All pilot fuel injections provided to a cylinder or engine cylinders during an engine cycle have a same pulse width. By increasing the number of pilot fuel injections, errors in the fuel injector transfer function may be more pronounced or detectable because additional pilot injections increase the engine air-fuel error and torque error if the fuel injector is not injecting a desired amount of fuel during the pilot fuel injections. Method 300 proceeds to 332 after the number of pilot fuel injections has been increased.

At 332, method 300 judges if the number of pilot fuel injections is greater than a threshold number of pilot fuel injections. In one example, the number is three, but other numbers are anticipated. If method 300 judges that the number of pilot fuel injections is greater than a threshold number, the answer is yes and method 300 proceeds to 334. Otherwise, the answer is no and method 300 returns to 314.

At 332, method 300 judges if the number of pilot fuel injections is greater than (e.g., G.T.) a threshold number of pilot fuel injections. In one example, the number is three, but other numbers are anticipated. If method 300 judges that the number of pilot fuel injections is greater than a threshold number, the answer is yes and method 300 proceeds to 334. Otherwise, the answer is no and method 300 returns to 314.

At 334, method 300 judges if the pilot fuel injections are at a maximum pilot fuel injection pulse width. If method 300 judges that the pilot fuel injections are at or greater than a maximum pilot fuel injection pulse width, the answer is yes and method 300 proceeds to 340. Otherwise, the answer is no and method 300 proceeds to 336.

At 340, method 300 returns to base pilot fuel injection amount and base main fuel injection amount. However, the pilot fuel injection amounts are supplied at pulse widths determined by the adapted or adjusted fuel injector transfer function. In this way, pilot fuel injections are adjusted after the fuel injector transfer function is adjusted. Method 300 proceeds to 342 after fuel injection is returned to base amounts.

At 342, method 300 deactivates glow plugs. Glow plugs are deactivated to reduce electrical power consumption and to increase glow plug life. Method 300 proceeds to exit after the glow plugs are deactivated.

In an alternative example, the fuel injector transfer function may be adapted in response to the vehicle and engine entering deceleration fuel shut off (DFSO). The vehicle may enter DFSO in response to a driver releasing the accelerator pedal and the vehicle decelerating from a speed greater than a threshold speed. During DFSO, a selected fuel injector may be reactivated while other fuel injectors remain off. The amount of fuel injected during the DFSO event may be estimated via an oxygen sensor, engine acceleration, or cylinder pressure. In one example, a small amount of fuel is injected via the reactivated fuel injector and the amount of fuel is estimated based on the oxygen concentration in the cylinder's exhaust, engine acceleration during the cylinder's expansion stroke, or peak cylinder pressure during the cylinder's expansion stroke.

If cylinder pressure transducers are deployed to determine amount of fuel injected to a sole cylinder during DFSO, the cumulative heat released during combustion may be determined via thermodynamics, and the total energy released from the burned fuel may be quantified. Knowing the fuel's energy density or heating value, that is the energy contained in the fuel per unit volume or mass or molecular count, or using a standard energy density, the total energy released can be converted into a quantity of fuel combusted. The quantity of fuel combusted may be further adjusted based on the engine's thermal efficiency at the present operating conditions.

If engine acceleration is the basis for determining an amount of fuel injected to a sole cylinder during DFSO, positive changes in the engine crankshaft acceleration/deceleration is a direct result of work done by the fuel being combusted and is proportional to the quantity of fuel combusted. The rate of change of the crankshaft rotational speed, or crankshaft acceleration, may be detected using the derivative of crankshaft speed as determined from a position sensor. The engine controller may adjust the fuel injector pulse width to match a predetermined crankshaft acceleration that was calibrated to correspond to a known desired quantity. The accuracy of estimating an amount of fuel injected may be improved by activating a glow plug in the cylinder receiving the fuel. Further, in some examples, glow plugs may be activated in cylinders not receiving fuel to maintain heat in the cylinders not combusting air and fuel. Further, the cylinder receiving fuel may combust a larger amount of fuel during each of a predetermined number of combustion events before the fuel injector injects a small amount of fuel and adapts the fuel injector transfer function based on the small injection amount so that the cylinder is at a desired temperature when adaption of the transfer function begins during DFSO.

A glow plug is activated in the cylinder receiving fuel during DFSO to promote combustion stability and improve accuracy of the estimation of amount of fuel injected to the cylinder during DFSO. Further, the operation of a glow plug in the cylinder receiving fuel during fuel injector adaptation in DFSO may also reduce variation in the combustion event and combustion efficiency due to noise factors that include but are not limited to: intake air temperature, intake air humidity, intake manifold temperature, intake manifold pressure, intake manifold humidity, intake manifold composition, presence of EGR in the intake manifold, engine coolant temperature, engine oil temperature, and fuel properties, most notably cetane number. After adaption of one fuel injector in one cylinder is complete, fuel is injected to a different cylinder while fuel is deactivated in all other cylinders. The glow plug in the cylinder receiving fuel is also activated.

Referring now to FIG. 4, the method of FIG. 4 may be at least partially incorporated into the system of FIG. 1 as executable instructions stored in non-transitory memory. Further, the method of FIG. 4 includes actions performed in the physical world.

At 402, method 402 activates glow plugs. Glow plugs are activated by delivering electrical current and voltage to the glow plugs. Controller 12 may supply electrical power to glow plugs, or alternatively, controller 12 may command a glow plug controller to activate glow plugs. Method 400 proceeds to 404 after glow plugs are activated.

At 404, method 400 adjusts an amount of electrical power provided to a glow plug based on a pulse width of a pilot fuel injection provided to a cylinder. Method 400 increases an amount of electrical power supplied to the glow plug as the pilot fuel injection pulse width decreases. Method 400 decreases an amount of electrical power supplied to the glow plug as the pilot fuel injection pulse width increases. In one example, the amount of electrical power supplied to the glow plug based on pilot fuel injection pulse width is empirically determined and stored to memory. Memory is indexed via the pilot fuel injection pulse width and memory outputs an amount of electrical power to supply to a glow plug. All engine glow plug electrical power may be adjusted in a same way. Method 400 exits after glow plug power is adjusted.

Thus, the method of FIGS. 3 and 4 provides for an engine operating method, comprising: receiving sensor data to a controller; judging if conditions are present for adjusting a fuel injector transfer function via the controller based on the sensor data; and activating a glow plug via the controller in response to the conditions being present. The method includes where the fuel injector transfer function is adjusted based on an engine air-fuel ratio sensed via an oxygen sensor. The method includes where the fuel injector transfer function is adjusted based on engine torque.

In some examples, the method further comprises operating a fuel injector via the controller in response to the conditions being present. The method includes where operating the fuel injector includes supplying pilot fuel injections via the fuel injector. The method includes where the transfer function describes flow through a fuel injector. The method includes where the transfer function describes flow though the fuel injector as a function of fuel injector activation time.

The method of FIGS. 3 and 4 also provides for an engine operating method, comprising: receiving sensor data to a controller; judging if conditions are present for adjusting a fuel injector transfer function in a pulse width range where pilot fuel injections are delivered via the controller based on the sensor data; and activating a glow plug via the controller in response to the conditions being present. The method further comprises adjusting an amount of electrical power delivered to the glow plug. The method includes where the amount of electrical power delivered to the glow plug is based on pilot fuel injection pulse width. The method includes where the amount of electrical power delivered to the glow plug is decreased as the pilot fuel injection pulse width is increased.

In some examples, the further comprises increasing a value of the transfer function if an engine air-fuel ratio is less than is desired. The method further comprises decreasing a value of the transfer function if engine torque is greater than is desired. The method further comprises deactivating the glow plug adjusting the fuel injector transfer function.

As will be appreciated by one of ordinary skill in the art, the method described in FIGS. 3 and 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. An engine operating method, comprising:
   receiving sensor data to a controller;
   judging if conditions are present for adjusting a fuel injector transfer function via the controller based on the sensor data; and
   activating a glow plug that is positioned in a cylinder of an engine via the controller in response to the conditions being present.

2. The method of claim 1, where the fuel injector transfer function is adjusted based on an engine air-fuel ratio sensed via an oxygen sensor.

3. The method of claim 1, where the fuel injector transfer function is adjusted based on engine torque.

4. The method of claim 1, further comprising operating a fuel injector via the controller in response to the conditions being present.

5. The method of claim 4, where operating the fuel injector includes supplying pilot fuel injections via the fuel injector.

6. The method of claim 1, where the fuel injector transfer function describes flow through a fuel injector.

7. The method of claim 6, where the fuel injector transfer function describes flow though the fuel injector as a function of fuel injector activation time.

8. An engine operating method, comprising:
   receiving sensor data to a controller;
   judging if conditions are present for adjusting a fuel injector transfer function in a pulse width range where pilot fuel injections are delivered via the controller based on the sensor data;
   activating a glow plug via the controller in response to the conditions being present; and
   adjusting an amount of power delivered to the glow plug, where the amount of power delivered to the glow plug is based on pilot fuel injection pulse width.

9. The method of claim 8, where the amount of power delivered to the glow plug is decreased as the pilot fuel injection pulse width is increased.

10. The method of claim 8, further comprising increasing a value of the fuel injector transfer function if an engine air-fuel ratio is less than is desired.

11. The method of claim 10, further comprising decreasing a value of the fuel injector transfer function if engine torque is greater than is desired.

12. The method of claim 11, further comprising deactivating the glow plug after adjusting the fuel injector transfer function.

13. An engine system, comprising:
   an engine having a combustion chamber;
   a fuel injector and a glow plug protruding into the combustion chamber; and
   a controller including instructions to activate the glow plug in response to a request to adjust a fuel injector transfer function in a pulse width region where pilot fuel injections are provided.

14. The engine system of claim 13, further comprising operating the fuel injector in the pulse width region where pilot fuel injections are provided in response to the request to adjust the fuel injector transfer function.

15. The engine system of claim 13, further comprising additional controller instructions for adjusting the fuel injector transfer function in response to an engine air-fuel ratio.

16. The engine system of claim 13, further comprising additional controller instructions for adjusting the fuel injector transfer function in response to engine torque.

17. The engine system of claim 13, further comprising additional controller instructions to decrease power supplied to the glow plug in response to increasing a pilot fuel injection pulse width.

18. The engine system of claim 13, where the fuel injector transfer function describes fuel injector flow.

* * * * *